Nov. 14, 1961   R. F. RISSE ET AL   3,008,698
ROTARY BORING HEAD HAVING DISK BREAKER MEANS
Filed Nov. 5, 1959   2 Sheets-Sheet 1
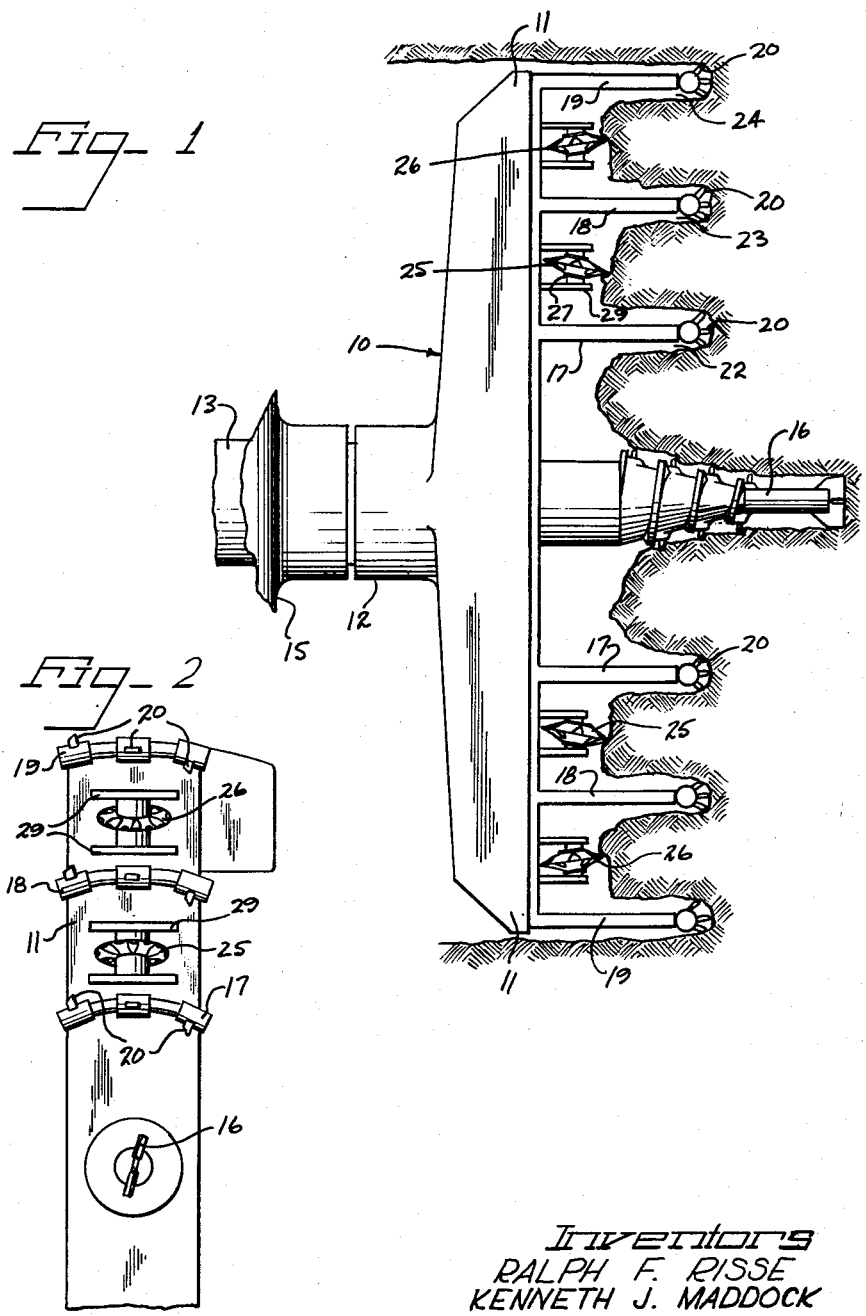
Inventors
RALPH F. RISSE
KENNETH J. MADDOCK

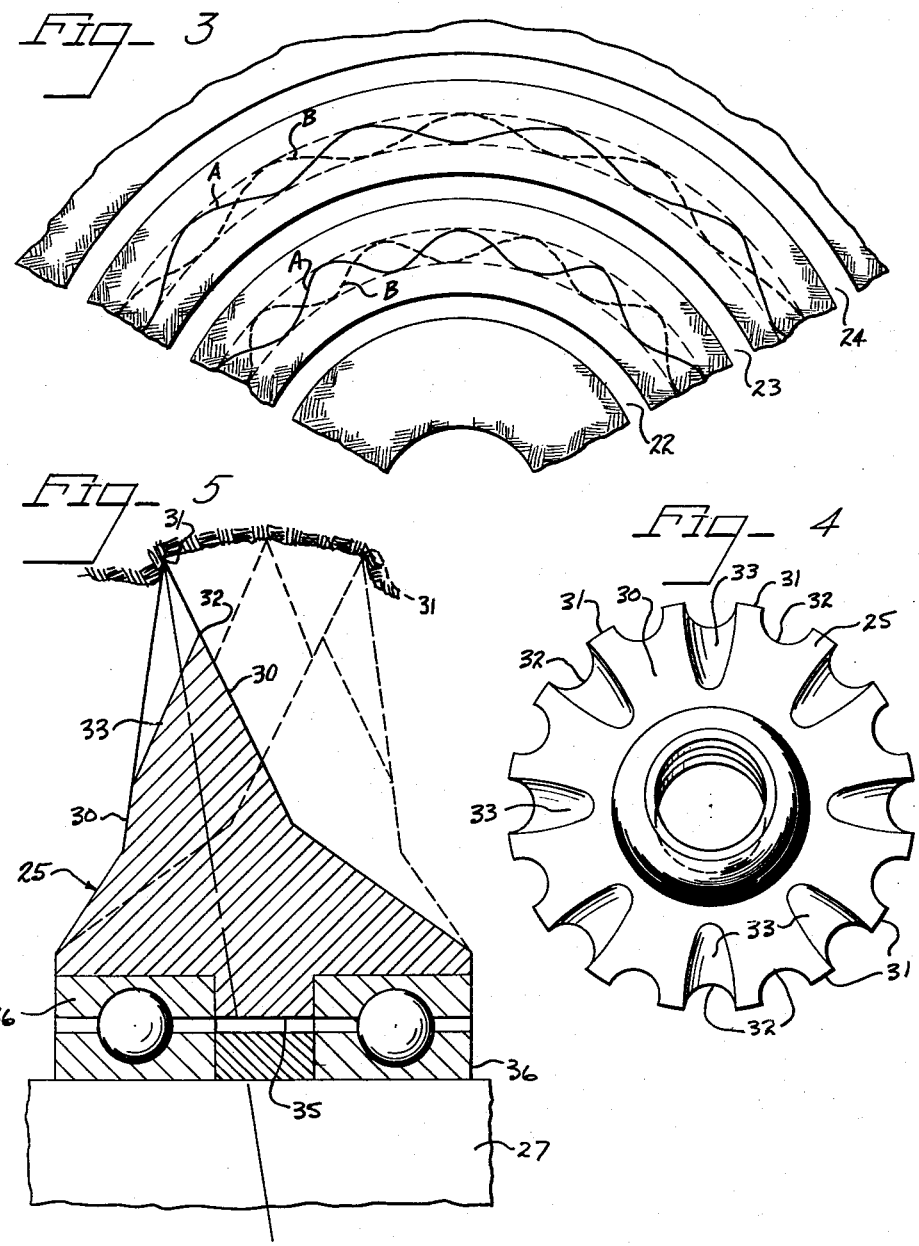

United States Patent Office 3,008,698
Patented Nov. 14, 1961

3,008,698
ROTARY BORING HEAD HAVING DISK
BREAKER MEANS
Ralph F. Risse, Chicago, and Kenneth J. Maddock, Frankfort, Ill., assignors to Goodman Manufacturing Company, Chicago, Ill., a corporation of Illinois
Filed Nov. 5, 1959, Ser. No. 851,070
2 Claims. (Cl. 262—9)

This invention relates to improvements in rotary boring heads for continuous mining machines for boring out a complete working face in coal, rock and the like, and more particularly relates to an improved core breaker for mining the cores between the rotary cutters of the boring head.

Continuous mining machines of the boring type are commonly provided with core breaking roller disks having wedge shaped cutting edges, which are either continuous or discontinuous, the discontinuous cutting edges being provided to prevent side slippage of the core breaker disk during cutting. Such core breaker disks however, tend to cut thin annular kerfs in the faces of the cores being broken down, and force the cores from the working face by the feeding thrusts on the boring head, forcing the core breaker disks to break the cores by the high thrusts of feeding and the wedging faces of the disks, rather than any cutting or breaking action of the disks. This results in high thrust and torque requirements to drive the boring head and force the core breaker disks to bring down the cores between the annular cutters.

It has been found that where the core breaker disks can rotate and travel back and forth during cutting, that the cutters by their rotating action, cut into the cores and exert continual side wedging forces thereon during the cutting operation and thereby materially reduce the thrust required to feed the boring heads into the working face and the torque required to rotatably drive the boring heads.

A principal object of the present invention is to provide an improved form of boring head having roller core cutter disks for breaking down the cores between the annular kerfs cut by the cutter bits of the boring head, in which the core breaker disks operate on the cores with an undulating cutting and breaking action during the core breaking operation.

A further object of the invention is to provide an improved form of boring head for rotary boring types of continuous mining machines and the like, in which the efficiency of boring is increased and the thrust and torque required to feed the boring head into the working face and rotatably drive the boring head is reduced by breaking the cores with a side sweeping cutting action movable thereacross, during the boring operation.

Still another object of the invention is to provide an improved form of rotary boring head for continuous mining machines and the like, having rotary disk cutters between the annular cutters of the boring head, so arranged as to position the leading and following rotary cutter disks to cut undulating annular kerfs in the cores left between the annular cutters, out of phase with respect to each other, to effect the removal of the cores from the working face with a cutting and wedging action.

These and other objects of the invention will appear from time to time as the following specification proceeds and with reference to the accompanying drawings wherein:

FIGURE 1 is a fragmentary view in side elevation of a rotary boring head constructed in accordance with the invention, showing the boring head in the operation of making a boring cut in a mine face;

FIGURE 2 is a fragmentary front end view of the boring head shown in FIGURE 1;

FIGURE 3 is a fragmentary diagrammatic view of a working face illustrating the cutting patterns of the cutter arms and core breaker roller cutter disks;

FIGURE 4 is a perspective view of one of the core breaker roller cutter disks; and FIGURE 5 is a partial fragmentary transverse sectional view taken through one of the rotary cutter disks, illustrating the positions the disk will take in cutting along a core.

In the embodiment of the invention illustrated in the drawings, 10 generally designates a rotary boring head having a plurality of radially extending arms 11, extending radially from a hub 12, mounted on and rotatably driven from a longitudinally extending shaft 13, rotatably supported in a gear casing 15 of a continuous mining machine and the like (not shown).

A pilot cutter 16 projects forwardly of the center of the boring head, for making an initial axial bore, as is usual with such boring heads.

As herein shown, two diametrically opposed radial arms 11 are provided, it being understood that any number of arms desired may be provided, dependent upon the spacing of the cutting surfaces required to mine a particular type of material.

Each boring arm 11 is provided with a series of radially spaced, forwardly projecting cutter supports 17, 18 and 19 each having cutter bits 20 projecting from their forward ends and inclined at various angles with respect to each other for cutting a series of concentric kerfs 22, 23 and 24 respectively, in the working face of a seam of material to be mined.

Between the cutter supports 17 and 18 and 18 and 19, are a series of rotary cutter disks 25 and 26 respectively, inclined in opposite directions with respect to each other to cut across the cores between the respective kerfs 22 and 23 and 23 and 24 with an undulating cutting action.

The rotary cutter disks 25 and 26 are of similar construction and are mounted on the boring arms 11 in a similar manner, and are preferably pitched in opposite directions to cut out of phase with respect to each other, that is, one rotary cutter disk sweeps across the core in one direction, while the other rotary cutter disk sweeps across the core in an opposite direction. The leading and following rotary cutter disks also sweep across the core in opposite phase relation with respect to each other, to enable a following rotary cutter risk to cut out the material left by a leading rotary cutter disk. It should be understood, however, that since the disks are freely rotatable and are rotated by engagement with the working face of the mine, that the phase relationship of the disks will vary, particularly where voids are encountered in the face. The construction and mounting of the rotary cutter disks 25 and 26 are similar, so the construction and mounting of one rotary cutter disk 25 need only be described in detail herein.

As illustratively shown in FIGURES 1, 2 and 5, the rotary cutter disk 25 is mounted on a shaft 27, shown as extending parallel to the front face of the boring arm 11. The transverse axis of said rotary cutter disk is inclined with respect to the axis of said shaft, to pitch the rotary cutter disk 25, to cut an undulating kerf in the working face of a mine. The shaft 27 is mounted at its ends in brackets 29, bolted or otherwise secured to the front face of the respective arm 11, and projecting forwardly therefrom.

The cutter disks 25 and 26 are similar to those shown and described in Patent No. 2,823,025 which issued to A. R. Biedess on February 11, 1958, and consist of a disk mounted for free rotation about the axis of the shaft 27 and inclined with respect to the axis of said shaft. Each cutter disk has a pair of opposed frusto-conical side faces 30 forming a generally circular, or wedge shaped periphery defining discontinuous wedge shaped cutting edges 31 and 32. The cutting edges 32 are alternately off-set laterally from the cutting edges 31 on opposite sides thereof. The laterally off-set cutting edges 32 are formed by alternately disposed, radially extending concave flutes 33 in the two frusto-conical side faces 30, each intersecting the opposite face 30, so that the cutting edges 31 are interrupted by the concavely scalloped cutting edges 32, curved alternately in opposite directions from the cutting edges 31. The scalloped wedge cutter portions 32 form cutting edges as sharp, or sharper than the cutting edges 31. Thus, as each roller cutter disk 25 engages a core of material, the scalloped wedge edges 32 cut alternately on one side and then the other of the cutting edges 31.

The cutter disk 25 has a central bore or apertured portion 35, the axis of which is at an angle to a plane extending through the diametrically opposed cutting edges 31, to pitch the rotary disk cutter 25 at an angle with respect to the shaft 27 and to thus cause the cutting edge 31 and the laterally off-set scalloped cutting edges 32 to cut along the working face of the material being mined along an undulating path, illustrated generally by reference character A in FIGURE 3. The rotary cutter disk 25 is mounted on the shaft 27 on spaced anti-friction bearings 36, which may be thrust types of ball bearings, taking the lateral thrust on the rotary disk cutters in opposite directions.

The solid lines A in FIGURE 3, indicate the cutting paths followed by the interrupted peripheral cutting edges 31 of the leading roller cutter disks 25 and 26, while the dotted lines B indicate the cutting paths followed by the interrupted peripheral cutting edges 31 of the trailing roller disks 25 and 26, inclined oppositely with respect to the leading cutter disks, assuming the leading and trailing rollers are 180° out of phase with respect to each other.

Thus, as the cutter arms 11 rotate, the wedge shaped cutting edges 31 and 32 of the cutter disks will follow around the cutting face in an undulating cutting path, cutting out the material with a wedging and side cutting action, traveling back and forth along the core and tending to break up the core to each side as it cuts into the core and rotates thereabout. This undulating cutting action about the cores, in which the cutters for each core cut in undulating paths out of phase with respect to each other, results in increased penetration and side thrusting and breaking action on the cores with a resultant decrease in thrust and torque required to break down the cores, and more uniformly broken cores, which may readily be picked up on the pick-up conveyor (not shown) of the machine.

Although we have herein shown and described one form in which our invention may be embodied, it will be understood that various changes and modifications in the invention may be attained without departing from the spirit and scope of the novel concepts of the invention, as defined by the claims appended hereto.

We claim as our invention:

1. A rotary boring head comprising a plurality of radially extending boring arms rotatable about a horizontal axis and having radially spaced inner and outer cutter bit carrying cutter supports projecting forwardly therefrom, at least one core breaker rotary cutter disk mounted on each boring arm between said radially spaced cutter supports, each cutter disk having a wedge shaped cutting periphery, means mounting said cutter disks for rotation about axes extending radially of the horizontal axis of rotation of said boring head, said cutter disks being freely rotatable on said mounting means and the wedge shaped cutting peripheries of said cutter disks being inclined at acute angles with respect to said radial axes whereby the cutting peripheries of said cutter disks oscillate about said radial axes and travel back and forth across the cores about axes intersecting said radial axes during rotation of said cutter disks and boring arms.

2. In a rotary boring head having a hub rotatable about a horizontal axis having a plurality of boring arms extending radially of said hub having radially spaced inner and outer cutter supports projecting forwardly therefrom and carrying forwardly projecting cutter bits, at least one rotary cutter disk mounted on each boring arm between a pair of radially spaced cutter supports, means mounting said cutter disks on said boring arms comprising shafts mounted on said boring arms in advance thereof and having radial axes, and bearing means mounted on said cutter disks having rotational axes inclined at acute angles to planes extending through the apices of the wedge shaped cutting peripheries of said cutter disks, and mounting said cutter bits on said shafts for free rotation with respect thereto about axes inclined with respect to the cutting peripheries of said cutter disks, to travel back and forth across the cores during rotation of said disks and boring heads and to cut along the cores left between said cutter bits in undulating paths in random out of phase relation with respect to each other.

References Cited in the file of this patent

UNITED STATES PATENTS

| | | |
|---|---|---|
| 2,754,099 | Tracy | July 10, 1956 |
| 2,783,038 | Tracy | Feb. 26, 1957 |
| 2,823,025 | Biedess | Feb. 11, 1958 |